2,755,168
Patented July 17, 1956

2,755,168

METHODS IN THE EVAPORATION OF LIQUORS OBTAINED IN THE DIGESTING OF CELLULOSIC MATERIALS WITH ALKALI SULPHITE AND/OR ALKALI BISULPHITE

Per Harald Collin, Skutskar, Sweden, assignor to Stora Kopparbergs Bergslags Aktiebolag, Falun, Sweden, a corporation of Sweden No Drawing. Application June 15, 1951,
Serial No. 231,915

2 Claims. (Cl. 23—49)

The present invention refers to a method of treating lyes or liquors obtained in the digesting of cellulosic materials with alkali sulphite and/or alkali bisulphite, so that these liquors do not form incrustations in the subsequent evaporating process. The method according to the present invention is substantially distinguished by the feature that alkali is added in the form of alkali sulphate to the liquor prior to the evaporation of the latter, whereupon said liquor is subjected to heating under pressure in one or more stages.

In digesting cellulosic materials such as wood with alkali sulphite and/or alkali bisulphite, the alkali must be recovered for economical reasons. In practice, this is effected in a manner analogous to the recovery of the alkali in the sulphate mills. Thus the liquor is recovered by diffuser washing or washing on filters, whereupon it is evaporated and combusted. If it be endeavoured to evaporate said liquor on an alkali basis without first treating the same in accordance with the present invention, severe incrustations will develop in the evaporating apparatus. Surprisingly enough, these incrustations have proved to consist substantially of calcium sulphate, that is to say, of the same material as the incrustations in the evaporation of ordinary calcium bisulphite waste lye.

Liquors from the digesting of alkali sulphite and/or alkali bisulphite consequently contain calcium. As no calcium is introduced with the cooking liquor, the same must originate from the wood, more particularly from the ashes thereof. Analyses of liquors on an alkali basis thus show a content of lime of 0.3–0.5 g. CaO per liter.

Liquors on an alkali basis consequently will have to be relieved of their contents of calcium, entirely or practically so, to permit of being evaporated without disturbances. According to the present invention, calcium is removed by alkali being added in the form of alkali sulphate prior to the evaporation of the liquor, whereupon the latter is heated under pressure. In accordance with current methods in the sulphate cellulose industry one would also in digesting with alkali sulphite and/or alkali bisulphite replace alkali losses arising in the process by an admixture of alkali sulphate to the thick liquor prior to the combustion of the latter in the soda furnace. In accordance with the present invention, the whole or a portion of the quantity of alkali sulphate required to cover the alkali losses of the process is instead supplied to the liquor before the evaporation of the latter. Hereby a high sulphate ion concentration is obtained in the liquor, which highly facilitates the precipitation of calcium in the form of calcium sulphate in the subsequent heating process under pressure. Experiments have thus shown that it will not be possible solely by heating under pressure, without any admixture of alkali sulphate, to precipitate more than about 20% of the contents of calcium of the liquor. However, if the heating under pressure is effected upon the admixture of alkali in the form of alkali sulphate, it will be found possible by heating under pressure to precipitate practically all of the calcium in the liquor in a single stage.

The quantity of alkali sulphate required to be admixed to the liquor to secure proper precipitation of calcium sulphate is highly dependent on the temperature to which the heating under pressure is effected, as well as on the time during which the liquor is maintained at this temperature. Experiments have proved that the period required for the precipitation of calcium is reduced with an augmented admixture of alkali sulphate and with an increased temperature, quite in accordance with what could be theoretically expected. At 175° C. and with an admixture of sulphate of 6.5 g. of sodium sulphate per liter of liquor, for example, corresponding to approximately 50 kilograms of sodium sulphate per ton of pulp, a period is thus required which is about 4 times as long as with an admixture of sulphate corresponding to 100 kilograms per ton of pulp. Experiments have proved, furthermore, that to obtain the same result of precipitation with one and the same admixture of sulphate, it will be necessary, at 150° C., to use a time about 10 times as long as at 175° C., in order that the same result of precipitation shall be obtained. In practical operation it has been found suitable not to go below 120° C. with respect to the time required for the precipitation.

Thus the quantity of alkali sulphate, the temperature used in the heating under pressure, and the time may be varied within wide limits. In practical operation, it has been found to be suitable to add the quantity of alkali sulphate corresponding to the alkali losses in the entire manufacturing process, but obviously the invention is not limited to this admixture. Thus only about 20% of this quantity is required at 200° C. to secure a practically complete precipitation of calcium. There is nothing, however, that would prevent the admixture of the whole batch prior to evaporation even with the use of high temperatures for the heating under pressure. Hereby it will be ensured that the admixture of alkali sulphate can be effected at a single point.

The calcium sulphate precipitated in the heating under pressure is obtained in the form of a fine sludge which need not necessarily be separated. It may thus follow with the liquor through the evaporating apparatus, a certain redissolution then taking place, however. As long as the redissolution is going on, obviously no precipitation of incrustations can take place. It has been found in certain cases, however, that this redissolution proceeds so rapidly in the first evaporating apparatus that reprecipitation will take place in one or a few of the last apparatuses. To obviate such happening, it is possible by filtering or some other suitable method to separate the sludge before the liquor is supplied to the evaporating apparatus. It is possible, also, to avoid the reprecipitation by subjecting the partly evaporated liquor to reheating under pressure before that evaporating apparatus in which reprecipitation would take place.

Direct steam is preferably used to bring about the rise of the temperature as required for the heating under pressure. By the use of direct steam a certain dilution of the liquor takes place. To reduce this dilution as far as possible, one may cause the liquor, on its having been heated under pressure, to expand in a vessel having a pressure prevailing therein which is considerably lower than that of the vessel for the heating under pressure. The steam then given off may be used, for instance, for heating purposes in other branches of the manufacture.

What I claim is:

1. In a method for the recovery of alkali by evaporation of the liquor obtained from the digestion of cellulosic materials with at least one alkali selected from the group consisting of alkali sulphite and alkali bisulphite, the improvement which comprises adding to the said liquor, prior to the evaporation thereof, an amount of sodium sulphate corresponding from approximately 20% to approximately 100% of the amount of alkali lost in the digestion process, and then subjecting the said liquor to pressure at a temperature of at least 120° C. to precipitate a substantial proportion of the calcium sulphate present in the liquor, thereby preventing incrustation during the evaporation of said liquor.

2. A method as recited in claim 1 in which the evaporation is performed in a plurality of stages, the liquor resulting from at least the first evaporation stage being subjected to pressure at a temperature of at least 120° C. to precipitate a further portion of calcium sulphate prior to further evaporation of the liquor.

References Cited in the file of this patent

UNITED STATES PATENTS

| | | |
|---|---|---|
| 1,399,845 | Bull | Dec. 13, 1921 |
| 1,754,207 | Bradley et al. | Apr. 8, 1930 |
| 1,823,519 | Thomsen | Sept. 15, 1931 |
| 2,140,992 | Gensecke | Dec. 20, 1938 |

FOREIGN PATENTS

| | | |
|---|---|---|
| 117,579 | Sweden | Nov. 5, 1946 |

OTHER REFERENCES

"Handbook of Chemistry," by Lange (5th edition), pages 174, 175, 244, 245, published by Handbook Publishing Co., Inc., Sandusky, Ohio (1944). (Copy in Div. 59.)